United States Patent
Steffenino

(10) Patent No.: US 9,581,022 B2
(45) Date of Patent: Feb. 28, 2017

(54) FREE-WHEELING-RESISTANT ROLLS FOR MINING ROOF SUPPORT AND THE COMBINATION OF A MINING MACHINE AND SUCH ROLLS

(71) Applicant: TENSAR CORPORATION, Alpharetta, GA (US)

(72) Inventor: John E. Steffenino, Greensburg, PA (US)

(73) Assignee: TENSAR CORPORATION, Alpharetta, GA (US)

( * ) Notice: Subject to any disclaimer, the term of this patent is extended or adjusted under 35 U.S.C. 154(b) by 0 days.

(21) Appl. No.: 14/274,247

(22) Filed: May 9, 2014

(65) Prior Publication Data

US 2014/0327293 A1    Nov. 6, 2014

Related U.S. Application Data

(63) Continuation of application No. 13/435,421, filed on Mar. 30, 2012, now Pat. No. 8,757,936.

(60) Provisional application No. 61/552,874, filed on Oct. 28, 2011.

(51) Int. Cl.

| | |
|---|---|
| *E21D 11/00* | (2006.01) |
| *B29C 65/48* | (2006.01) |
| *B65H 18/28* | (2006.01) |
| *E21C 35/04* | (2006.01) |
| *E21D 5/00* | (2006.01) |
| *B65H 18/00* | (2006.01) |
| *E21D 5/12* | (2006.01) |

(52) U.S. Cl.
CPC ............... *E21D 5/00* (2013.01); *B29C 65/48* (2013.01); *B65H 18/00* (2013.01); *B65H 18/28* (2013.01); *E21C 35/04* (2013.01); *E21D 5/12* (2013.01); *E21D 11/00* (2013.01)

(58) Field of Classification Search
CPC .................................. B65H 19/29; B65H 18/28
USPC ................................ 405/302.3; 156/60, 184
See application file for complete search history.

(56) References Cited

U.S. PATENT DOCUMENTS

| | | | | |
|---|---|---|---|---|
| 4,103,058 | A | * | 7/1978 | Humlicek ...................... 428/171 |
| 4,116,743 | A | * | 9/1978 | Davis .................. D06M 15/693 |
| | | | | 152/451 |
| 4,117,894 | A | | 10/1978 | Saunders |
| 4,199,193 | A | | 4/1980 | Damron et al. |
| 4,421,808 | A | * | 12/1983 | Winkowski ............... B44C 7/00 |
| | | | | 428/151 |

(Continued)

*Primary Examiner* — Tara M. Pinnock
(74) *Attorney, Agent, or Firm* — Jacobson Holman, PLLC.

(57) ABSTRACT

A roll of grid material for mine roof support, and a mining machine in combination with such a roll, in which the roll has bands of adhering material injected or otherwise forced into the roll in spaced locations along the roll's width. The adhering material interconnects the overlapped layers within the roll and is sufficiently strong to hold the grid material in the rolled configuration for transport and storage, and yet is readily pulled apart in response to sufficient manual or mechanical pressure applied against the roll, or tension applied to the unwound portion thereof, so as to enable the grid material to be incrementally unwound and installed in the mine. The rolls can be installed using a range of mining machines without need for any specialized dispensing or other apparatus mounted on the machine and without the need for any mechanical device to control unwinding.

18 Claims, 7 Drawing Sheets

(56) References Cited

U.S. PATENT DOCUMENTS

| | | | | |
|---|---|---|---|---|
| 4,768,810 A | * | 9/1988 | Mertens | B41L 1/26 281/5 |
| 4,960,349 A | * | 10/1990 | Willibey | D03D 13/006 405/262 |
| 5,091,247 A | * | 2/1992 | Willibey | D03D 15/00 139/420 A |
| 5,096,335 A | * | 3/1992 | Anderson | E21D 11/152 405/150.1 |
| 5,199,825 A | * | 4/1993 | Travis | E21D 11/152 299/12 |
| 5,687,523 A | * | 11/1997 | Stough | B32B 29/02 428/110 |
| 5,776,591 A | * | 7/1998 | Mertens | B32B 7/06 283/105 |
| 5,816,750 A | | 10/1998 | Steffenino | |
| 8,291,663 B2 | | 10/2012 | Banta | |
| 2004/0096483 A1 | * | 5/2004 | Wilks et al. | 424/443 |
| 2006/0124247 A1 | * | 6/2006 | Collins et al. | 156/446 |
| 2011/0186505 A1 | | 8/2011 | Diemer et al. | |

\* cited by examiner

FREE-WHEELING-RESISTANT ROLLS FOR MINING ROOF SUPPORT AND THE COMBINATION OF A MINING MACHINE AND SUCH ROLLS

This application is a continuation of co-pending application Ser. No. 13/435,421, filed Mar. 30, 2012, which claimed the priority of U.S. Provisional application Ser. No. 61/552,874, filed Oct. 28, 2011, the priority of which is hereby claimed.

BACKGROUND OF THE INVENTION

Field of the Invention

The present invention is related to the field of mining and, more particularly, to rolls of polymeric mesh or grid material for support of mining tunnels, which rolls are self-resistant to unrolling, a method of making such rolls, and a method of using and installing the same including installation of the rolls with a mining machine.

Description of the Related Art

Mining practices have long included the use of a continuous miner having integrated roof bolters to support the ceiling or roof of a mine tunnel both during and after a cutting operation. In addition, supplemental roof supports in the form of continuous lengths or sheets of metallic mesh or wire grids have been installed on the mine tunnel roof. While the roof bolts provide the workers with their primary protection, the mesh mats or grids are used to support loose strata and thereby provide secondary protection against material that may fall between the roof bolts.

Installation of the supplemental roof support meshes or grids may be performed manually, either while the continuous miner is in place or after the continuous miner has been withdrawn from the tunnel that is to be supported. Meshing mine tunnels with welded metal wire or mesh mats has always been a very time consuming and dangerous task as they are heavy to manipulate and, when damaged, can inflict puncture injuries on the installers.

The elimination of wire meshes or mats in favor of rolled polymeric mesh materials represented an improvement for workers in the mining industry as the polymeric mesh materials enable the mine roof to be meshed without the need to handle wire panels. In addition, mechanized methods of meshing the roof further ease the burden on mine workers.

Many systems have been developed that allow polymeric mesh rolls to be held and controlled by attaching a deployment apparatus to the continuous miner or other mining machine. One such system is disclosed in U.S. Pat. No. 5,816,750 ("the '750 patent"), which is commonly owned by the assignee of the present application and is hereby expressly incorporated by reference as if fully set forth herein.

The '750 patent discloses a grid layout system including a grid dispenser for rolls of polymeric mesh or grid material. The grid dispenser is mounted on the boom of the continuous miner and, in response to tension on the roll created by forward and rearward movement of the continuous miner during a cutting operation, incrementally dispenses or retracts the polymeric mesh or grid material above the continuous miner which is then bolted to the mine tunnel roof. To prevent the roll from unwinding when the continuous miner stops, the grid dispenser of the '750 patent is provided with a motor that exerts a retractive force on the roll which holds the mesh material under tension in the dispenser.

As noted, the grid layout system disclosed in the '750 patent requires a grid dispenser attached to the mining machine, such that the machine must be modified to include the dispenser. Therefore, a need exists for a method of deploying and controlling the unrolling of mesh rolls during installation of such rolls for mining roof support that does not require a special deployment device attached to the mining machine but which can use the mining machine's existing structure to hold the roll. A need also exists for a method of deploying mesh rolls that can accommodate not only horizontal orientations, but vertical and diagonal orientations as found on mine walls or other surfaces.

SUMMARY OF THE INVENTION

In view of the foregoing, the present invention is directed to the meshing of mine roofs with continuous lengths or sheets of polymeric grid material. The grid material is wound into rolls of overlapping layers and unwound during installation on mining tunnel ceilings to provide roof support. In this application, "ceiling" and "roof" are used interchangeably and can include the tunnel side walls as well as the ceiling or roof.

To prevent free-wheeling of the rolls before and during the installation process, the rolls are secured in the rolled configuration by an adhering material that interconnects the overlapped layers within the roll. The adhering material is sufficiently strong to hold the grid material in the rolled configuration for transport and storage, and yet is readily pulled apart in response to sufficient manual or mechanical force applied against the roll so as to enable the grid material to be incrementally unwound and installed in the mine. Alternatively, if the roll is held in place, such as by a rod down its center, the force can be in the form of tension applied to the unwinding portion of the roll, such as by pulling. Hereinafter, the terms "mesh" and "grid material" are used interchangeably and are intended to refer to polymeric materials.

The present invention is also directed to polymeric mesh rolls secured in the rolled configuration by an adhering material and used for mine roof support, in combination with a mining machine that is used to install the rolls. The mining machine does not require any particular structure or device to hold and dispense the roll so that a wide variety of mining machines may be used in combination with the free-wheeling-resistant rolls.

Accordingly, one object of the present invention is to simplify the equipment needed to apply mesh or grid material to mine tunnel roofs.

Another object of the present invention is to provide polymeric mesh rolls for mining roof support that are constructed to be, in themselves, resistant to unrolling.

A further object of the present invention is to provide polymeric mesh rolls for mining roof support in accordance with the preceding objects in which the rolls are provided with an adhering material having sufficient strength to hold a stationary roll in the rolled configuration and prevent free-wheeling thereof but that, when subjected to an unwinding force, may be torn apart so as to allow the roll to readily unwind as part of the mesh installing operation.

Yet another object of the present invention is to provide polymeric mesh rolls for mining roof support in accordance with the preceding objects in which the rolls are formed from a length of polymeric mesh material and in which the adhering material may be applied either before, while, or after the mesh is rolled up into the rolled configuration.

Still another object of the present invention is to provide polymeric mesh rolls for mining roof support in accordance with the preceding objects that do not require any special dispensing structure but may be effectively supported on and dispensed from many different types of mining machines using the machine's existing drill rods/steels and/or superstructure to hold the roll in place during installation.

Yet a further object of the present invention is to provide polymeric mesh rolls for mining roof support in accordance with the preceding objects that can be mounted in any orientation including, but not limited to, horizontally, vertically or diagonally.

Another object of the present invention is to provide polymeric mesh rolls for mining roof support in accordance with the preceding objects in which the adhering material may be selected to provide for adjustable resistance to unrolling by varying the type of adhering material and/or the amount of adhering material placed on the rolls.

A further object of the present invention is to provide polymeric mesh rolls for mining roof support in accordance with the preceding objects in which the adhering material is a foam or adhesive material.

A still further object of the present invention is to provide polymeric mesh rolls for mining roof support in accordance with the preceding objects in combination with a mining machine for installing the rolls in which the mining machine does not require any specialized structure for support of the rolls during installation thereof.

Another object of the present invention is to provide a method of installing polymeric mesh rolls that are self-resistant to unrolling onto a mine roof or ceiling, the method including incrementally unwinding the mesh roll by applying manual or mechanical force on the roll to unwind a portion of the roll while the remainder of the roll remains intact due to its self-resistance to unrolling.

Yet another object of the present invention is to provide a method of installing polymeric mesh rolls that are self-resistant to unrolling onto a mine roof or ceiling as set forth in the preceding object, in which mechanical force for unwinding the roll is applied to the roll by movement of a mining machine upon which the roll is supported.

A further object of the present invention is to provide a method of preventing polymeric mesh rolls from free-wheeling before and during installation on a mine roof by applying an adhering material to the rolls having sufficient strength to hold the rolls in a wound configuration and prevent the rolls from unwinding due to their own physical properties.

Yet a further object of the present invention is to provide a method of preventing polymeric mesh rolls from free-wheeling in accordance with the preceding object in which the adhering material is a foam that is pulled apart when sufficient unwinding force is applied to the outer layer or free end of the roll to provide for incremental unwinding of the roll.

Still another object of the present invention is to provide a method of making a polymeric mesh roll that is self-resistant to free-wheeling both before and during installation of the mesh material on a mine roof, by applying an adhering material to the mesh material before or as the mesh material is wound into a rolled configuration, or by injecting an adhering material into the polymeric mesh roll after the roll has been wound.

It is yet another object of the invention to provide polymeric mesh rolls for mining roof support in accordance with the preceding objects that are not complex in structure and which can be manufactured at low cost but yet can be readily unrolled at a controlled rate for easy, safe and effective installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
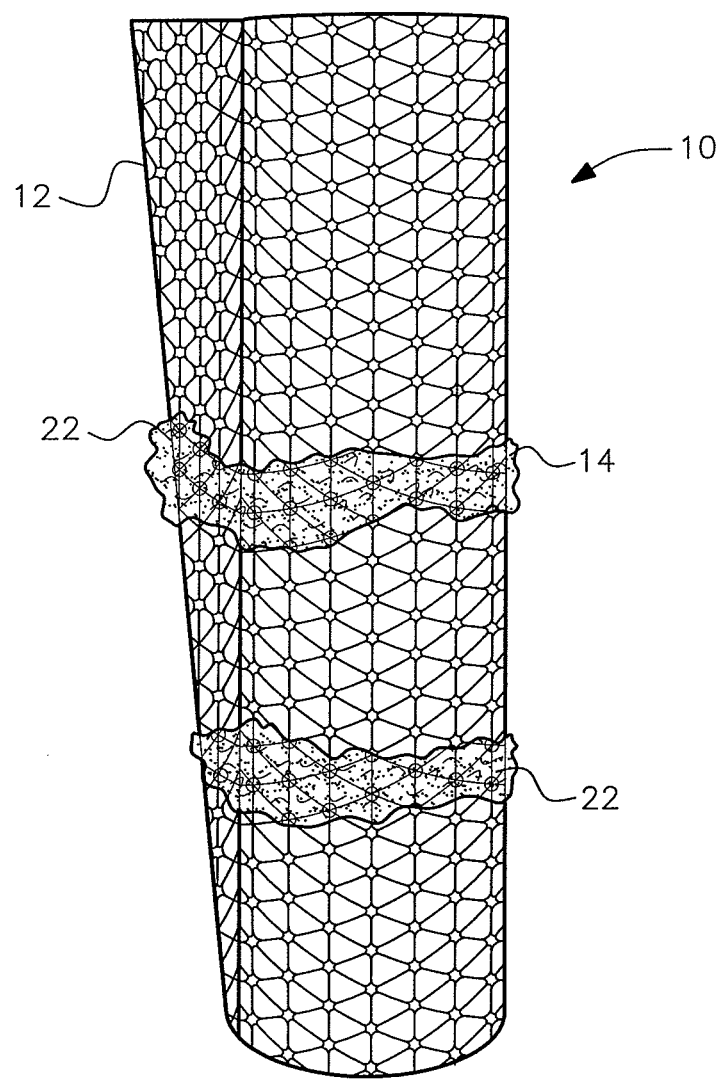
FIG. 1 is a photograph of a polymeric mesh roll held in the rolled configuration by an adhering material in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The present invention is involved with mining systems such as that described in the '750 patent in which polymeric mesh or grid material is secured to the ceiling of a mine passageway by roof bolts. Further description of such a representative mining system is provided in the '750 patent and therefore will not be further described herein.

As shown in FIG. 1, the present invention is directed to a mesh roll generally designated by reference numeral 10. The roll includes a length of polymeric mesh or grid material 12, preferably uniaxially, biaxially or triaxially oriented integral geogrids of the type which are commercially available from The Tensar Corporation of Atlanta, Ga. ("Tensar").

According to the invention, a length of mesh 12 is rolled up and held in the rolled configuration by an adhering material 14. The adhering material 14 secures adjacent layers or laps of the mesh 12 to one another so that the roll 10 is self-resistant to unrolling.

Figure 2:
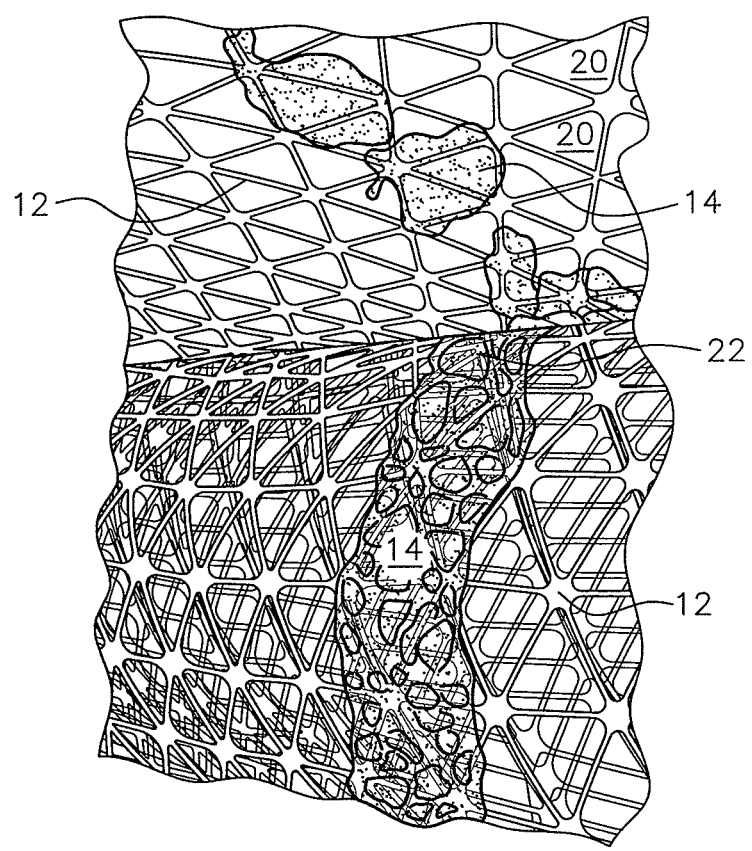
FIG. 2 is a close-up photograph of a portion of the polymeric mesh roll shown in FIG. 1 that includes a band of the adhering material.
Figure 3:
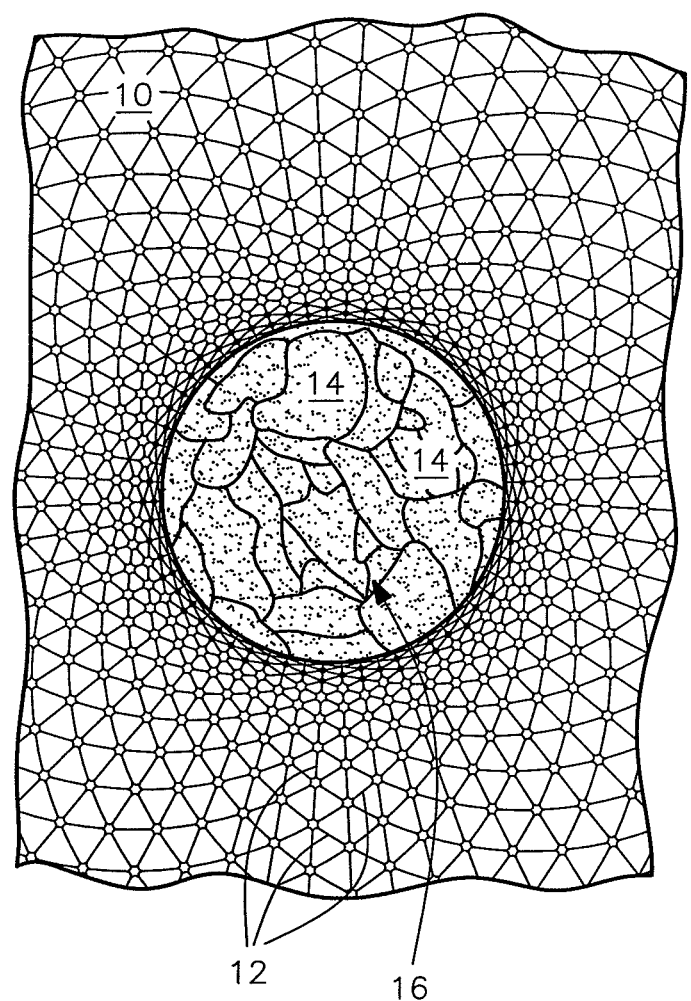
FIG. 3 is a photograph taken from the end of the roll shown in FIG. 1 and through the center of the roll where the adhering material can be seen to have penetrated therein.

As shown in FIGS. 2 and 3, the adhering material 14 penetrates toward and even into the center, generally designated by reference numeral 16, of the roll 10 so that virtually all of the layers of mesh 12 which overlap with one another as a result of the rolling process are secured to one another. The adhering material 14 has sufficient strength to hold a stationary roll 10 in the rolled configuration without other means of holding the roll intact and prevent freewheeling and/or unwinding of the roll due to the inherent physical properties of the roll and the material from which it is made, such as the material weight, stiffness, springiness, etc.

Figure 4:
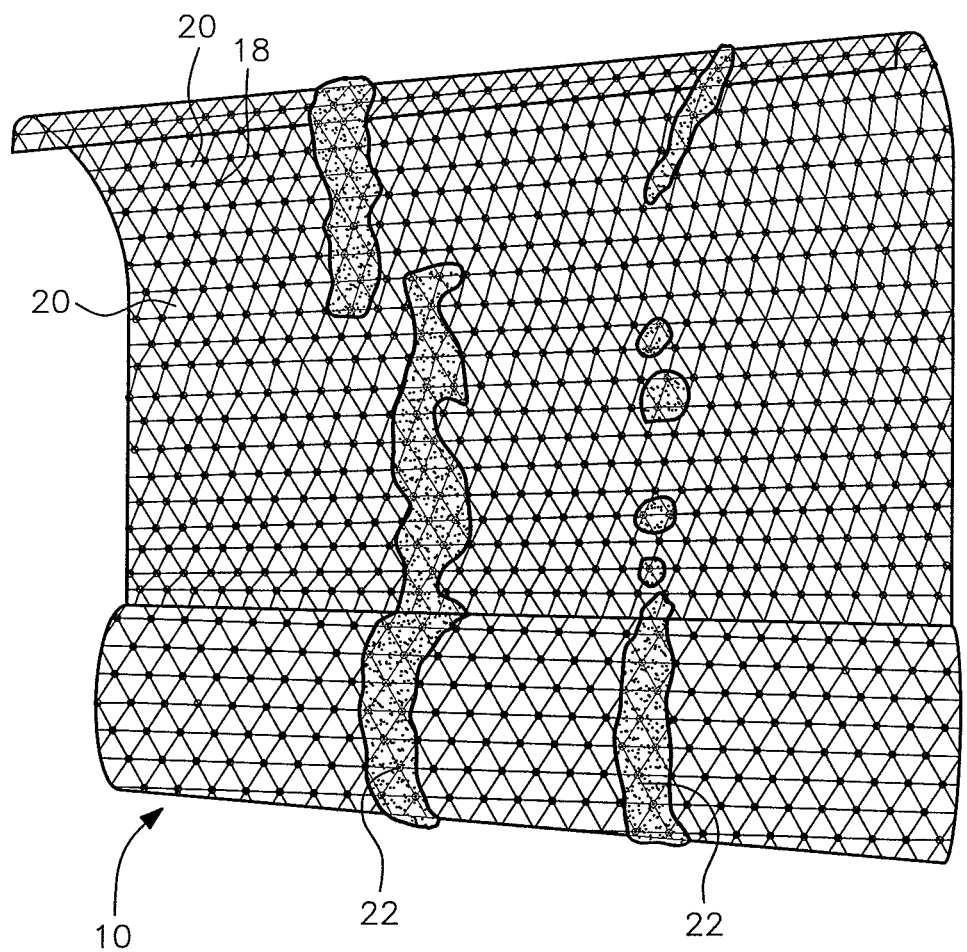
FIG. 4 is a photograph of the polymeric mesh roll shown in FIG. 1 in a partially unrolled and suspended configuration, illustrating the strength of the adhering material to resist further unrolling when subjected to the weight of the roll.
Figure 5:
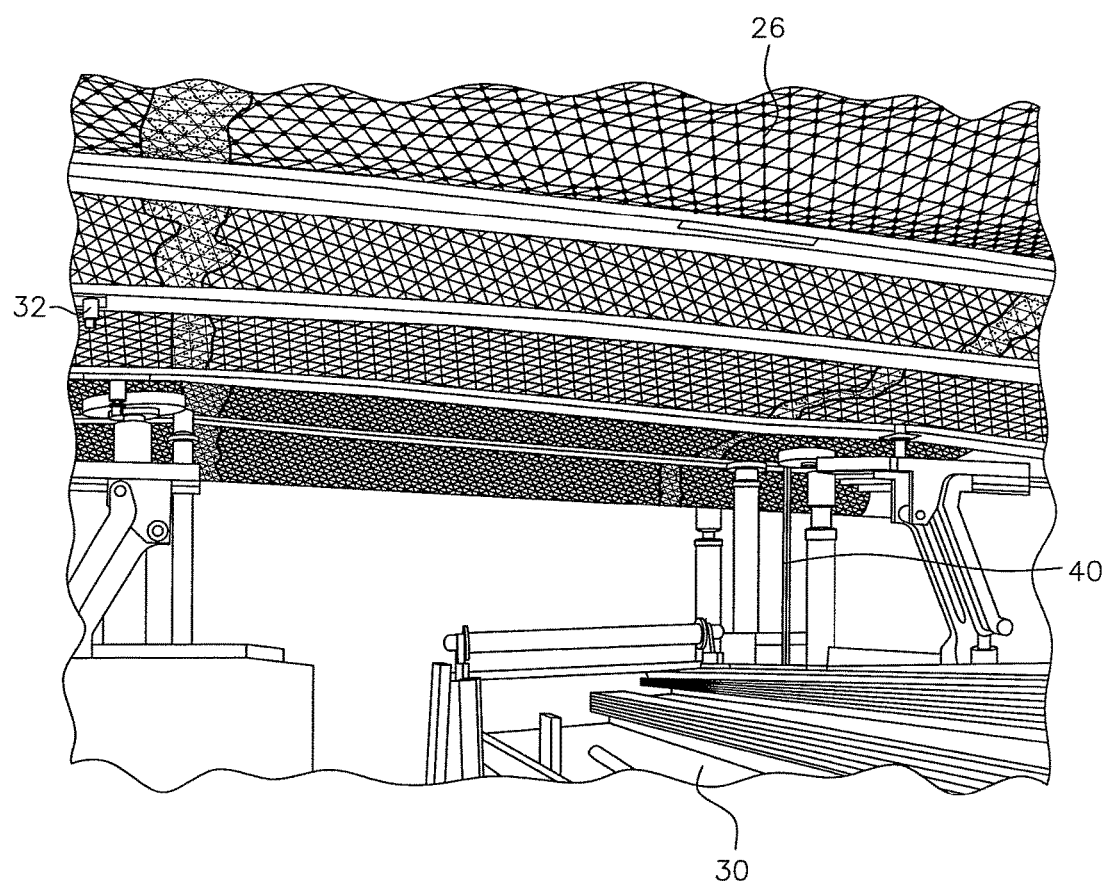
FIG. 5 is a photograph of a polymeric mesh roll held in the rolled configuration by an adhering material in a test installation on the roof of a mine using a mining machine in accordance with the present invention.
Figure 6:
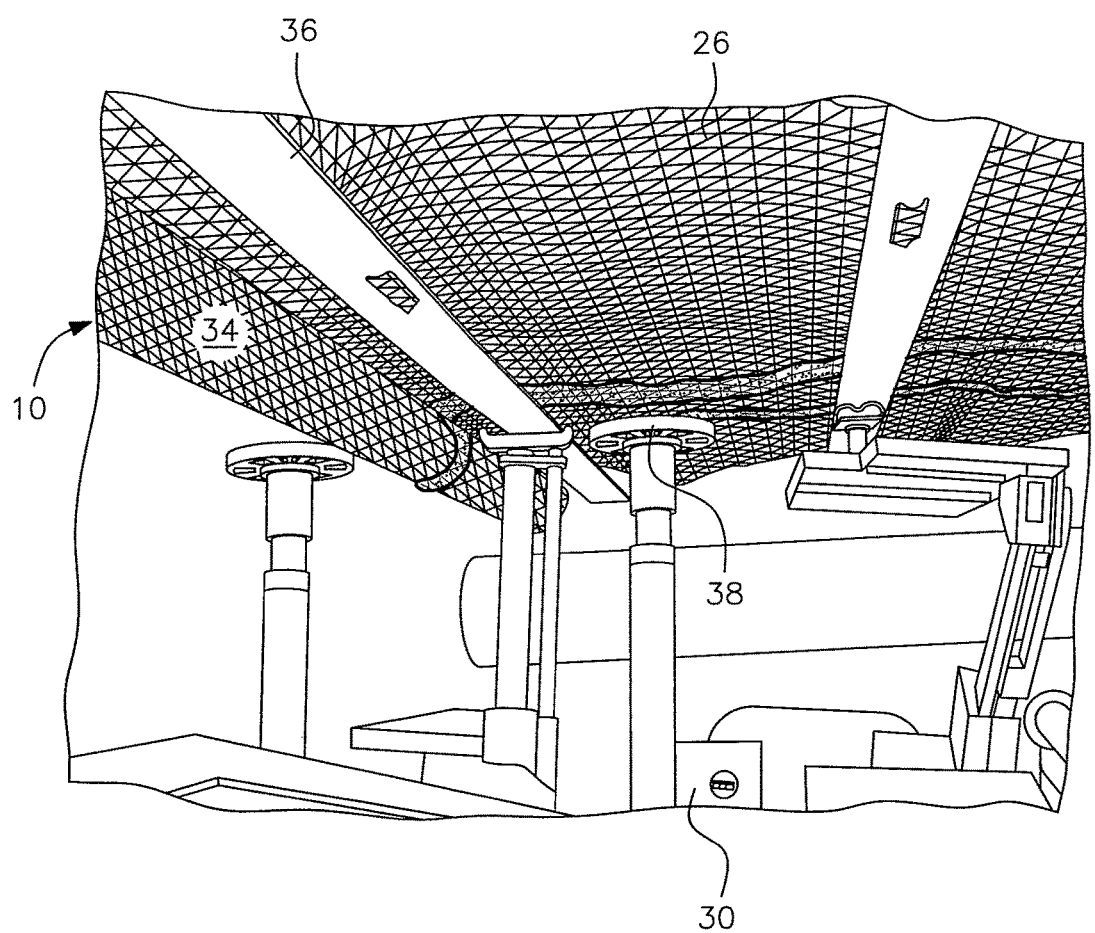
FIG. 6 is a close-up photograph showing a side view of the polymeric mesh roll of FIG. 5 during the test installation, with the unrolled portion of the roll being supported above the mining machine and adjacent the mine tunnel roof by a channel strap that extends between two lifting jacks of the mining machine.
Figure 7:
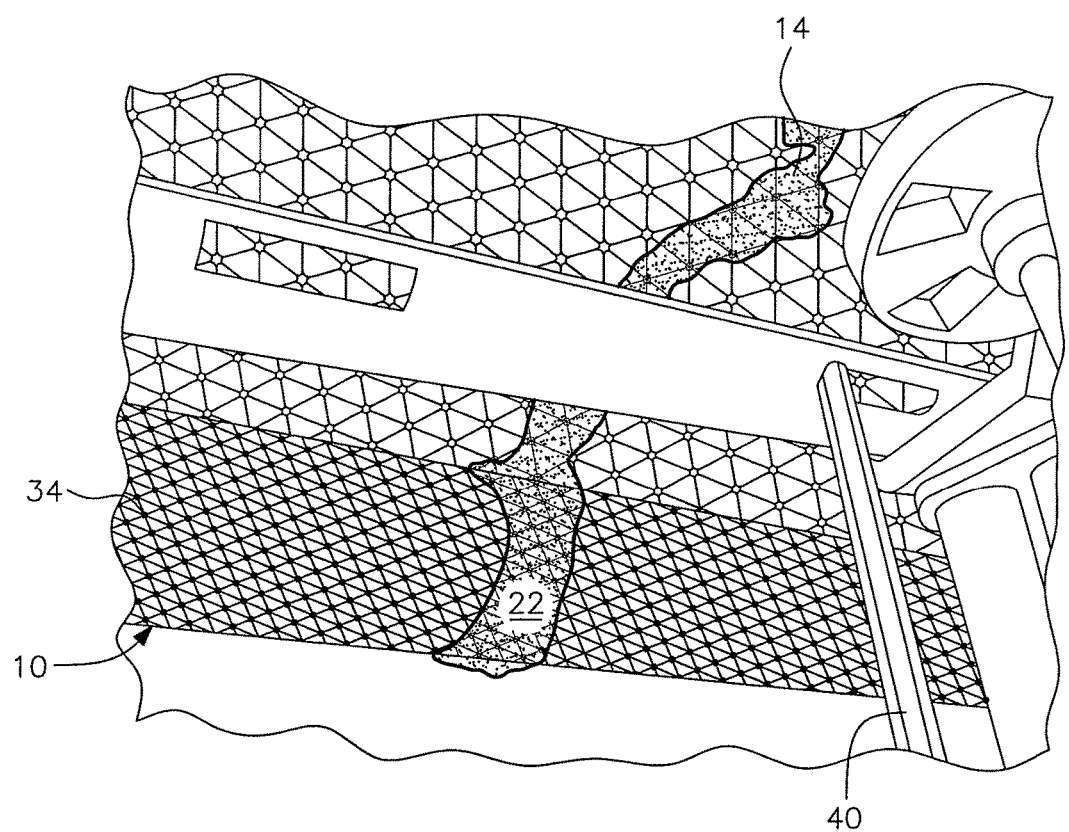
FIG. 7 is a close-up photograph of the polymeric mesh roll shown in FIGS. 5 and 6 during the test installation, with the unrolled portion of the roll being supported by a channel strap and held against the mine roof ready to be installed.

Preferably, the adhering material is at least strong enough to resist unrolling when subjected to the weight and other physical properties of the roll itself, as shown in FIG. 4 by the roll 10 being held above the ground by its unwound leading end 18, as well as in FIGS. 5-7 during a test installation of a roll of polymeric mesh material. The degree of adhesive strength required may differ according to the mesh material being used, being more or less for rolls of the same weight when such rolls are constructed of various mesh materials having different grid compositions, grid size, thickness, etc., all of which can contribute to the rolls' overall stiffness or inherent resistance to being wound into a roll. However, a strength less than that required to resist unrolling due to the roll's weight could be used in certain installation operations such as when the roll is supported on a surface, such as a mining machine, so that the free edge is not subjected to the roll's weight. With the desired degree of strength, the roll 10 can be unrolled in a controlled manner, with the adhering material 14 that holds each layer or lap of the mesh 12 to the roll breaking free under sufficient tension and in an incremental manner, as occurs during installation of the mesh. At the same time, the remainder of the roll, not yet under installation tension, remains intact as a roll.

The present invention is further directed to making mesh rolls that are self-resistant to unwinding. To form a roll 10 according to the present invention, a length of polymeric mesh material 12 may be first wound into a roll after which, when in the rolled configuration, the adhering material 14 is applied, injected or otherwise impressed through the mesh openings 20 and inwardly into the roll interior (see FIGS. 2 and 4).

Alternatively, the adhering material 14 may be applied to a length of mesh 12 just before and/or as it is being wound into a rolled configuration at the manufacturing plant where the rolls are made. The adhering material 14 may be sprayed, injected, rolled or otherwise applied by any application technique suitable for the material being applied as would be understood by persons of skill in the art.

The adhering material 14 is preferably a foam or other type of adhesive material. One embodiment of the adhering material for the present invention is a product known as TOUCH N' SEAL® polyurethane mine foam, manufactured by Convenience Products of Fenton, Mo. The product description and technical data describing the TOUCH N' SEAL® mine foam product is available at www.touch-n-seal.com. Another foam product that could be used according to the present invention is Fomo Foam polyurethane spray foam, manufactured by Commercial Thermal Solutions, Inc. of Spring Lake, N.J.; details on the Fomo Foam product are available at www.fomofoam.com. Other foam products having comparable composition and adhering capabilities could also be used, as could various adhesive products, as would be understood by persons of ordinary skill in the art.

The TOUCH N' SEAL® mine foam product provides the desired adhering capability and is also flame-retardant which is important for underground use when combustion regulations must be followed. In mining situations in which flame-retardant materials are not required, such as in hard rock environments, then non-flame-retardant adhering materials could be used.

Preferably, the foam adhering material is injected through the nozzle of an applicator gun such as that shown at www.touch-n-seal.com or as part of the Fomo Foam insulation kit shown at www.fomofoam.com. When injecting the foam, the operator typically varies the amount of pressure during the foaming process, starting with more pressure in order to inject the foam into the center 16 of the roll 10 and then applying less pressure as the nozzle is drawn away from the center to the outside of the roll.

The amount of foam or adhesive adhering material 14 needed is dependent upon the roll's physical properties and the length of the roll 10. As would be understood by those skilled in the art, less adhering material is needed for smaller rolls or rolls made of a relatively flexible material that is readily wound, while a larger volume of adhering material must be used for larger, heavier rolls and rolls made of a stiffer material. The type of adhering material may also be varied depending upon the size and physical properties of the particular rolls, where a weaker adhesive may be sufficient for smaller rolls and/or rolls of fairly flexible material while a stronger adhesive is needed for larger rolls and/or rolls made of a material more resistant to being wound. A sufficient volume of adhering material and/or an adhering material of the necessary strength will preferably be at least that amount and/or type of material that provides enough resistance to unwinding of the roll so that a given roll's unwound weight will not cause the roll to unwind when the roll is lifted by the free end 18 of the rolled material (see FIG. 4).

To achieve the needed resistance to unrolling, the adhering material 14 may be applied in a plurality of bands 22 spaced from one another along the width of the roll. In the roll shown in FIG. 1, two such bands 22 have been applied. However, in most mining applications, the rolls are larger, being on the order of between about 6 feet and about 17 feet in width, and of varying lengths. A roll that is 13.12 feet in width and 90 feet in length will, of course, require less adhering material than a roll that is the same width and grid material but 180 feet in length, due to the increased weight of the longer roll.

According to one embodiment, multiple bands 22 of adhering material approximately 2.5 inches to 3 inches in width are injected into the roll around the entire circumference thereof in spaced locations along the roll's width. Preferably, there are four such bands in a roll that is 13 feet wide, one at each edge of the roll and one spaced from each roll edge about 4.5 feet. However, the arrangement of the bands and their number may be varied provided the total amount of adhering material is sufficient to prevent the roll from unwinding under its own weight, in combination with other physical properties, when suspended from an unwound portion of the roll as shown in FIG. 4.

Because the polymeric mesh rolls according to the present invention are self-resistant to unrolling through the retaining force of the adhering material, the rolls do not require any special dispensing structure when being installed using a mining machine. On the contrary, the mesh rolls may be effectively supported on and dispensed from many different types of mining machines using the machine's existing drill rods/steels and/or super-structure to hold the roll in place during unrolling as shown in FIGS. 5-7.

FIG. 5 is a photograph of a polymeric mesh roll in accordance with the present invention with a length 26 of the roll following a leading edge (not shown in FIG. 5) thereof being unwound, extended above the mining machine 30 and secured to the ceiling of the mine by roof bolts 32. FIG. 6 is a closer view of the roll installation set-up shown in FIG. 5, showing the unrolled portion 34 of the roll 10 supported by a channel strap 36 that extends between two lifting jacks 38 at the front end of the mining machine 30.

FIG. 7 is a close-up photograph of the polymeric mesh roll shown in FIGS. 5 and 6 and held against the mining machine's raised drill rod 40. The drill rod is used to drill holes for the roof bolts that will serve to support the mine tunnel roof and secure the mesh material thereto. The raised drill rod/steel 40 holds the unrolled portion 34 of the roll 10 in place during installation. As the mining machine 30 moves forward (to the left in FIG. 6), the roll is rotated against the raised drill rod/steel and pushed thereby, pulling the adhering material 14 apart on the outer portion of the roll and allowing a length 26 of the roll to be unwound as the machine continues to move forward.

As an alternative to mechanically controlling the unwinding process using movement of the mining machine as just described, the machine operator can control the amount of the roll to be deployed by manually pushing or pulling against the roll. For example, the machine operator or other installer can use a rod and hook bar to latch onto the roll and, by applying force to break the bond between the adhering material and each lap of mesh, unroll what is needed prior to machine advancement.

When the rolls are being installed using different machines, or for vertical applications, the roll 10 may be held in place by inserting a rod (not shown) through the center of the roll around which the roll may be unwound. Similarly, if the mining machine does not have a drill rod/steel, a rod (not shown) may be positioned in various locations on the machine to secure the roll and allow rotation to unwind the roll.

To start installation of a roll, approximately one foot of mesh material at the roll's leading edge is stripped from the roll to create a leader (see the free end 18 in FIG. 4). The leader is then bolted to the mine roof. The unwound portion 34 of the roll 10 is then located on the advancing side of the machine's raised roof drill rod 40 as shown in FIGS. 5 and 7. Just prior to advancement of the machine, the drill rod is located to permit the roll material to pass between the top of the rod and the mine ceiling. The amount of space between the drill rod top and the mine ceiling must not be too great or the roll may have room to squeeze between the drill rod and the ceiling. When properly positioned, the machine 30 is then advanced to deploy the roll; alternatively, the operator pulls the desired length of the mesh material loose from the roll. As the mesh material is unwound, the deployed length 26 of the roll is secured to the roof using roof bolts 32 or other appropriate fasteners as would be known in the art.

The mesh rolls according to the present invention can be mounted in any orientation including, but not limited to, horizontally, vertically or diagonally. For example, the installation method as described herein may be used to secure the polymeric mesh material to the side walls of the mine via vertically located rolls (not shown) positioned on each side of the continuous miner or roof bolter. For vertical installations, a location/roll securing rod is needed to hold the roll in place on the machine.

As described herein, the present invention further provides a method for installing mesh rolls that does not require a specialized dispenser or other equipment mounted to the mining equipment. The polymeric mesh rolls are held in a rolled configuration by adhering material that can be adjusted in terms of both type and amount to provide the necessary resistance to unrolling for a particular mining installation and roll size. The method includes incrementally unwinding the mesh roll by applying manual or mechanical force on the roll to unwind a portion of the roll. Mechanical force for unwinding the roll may be applied to the roll by movement of the mining machine upon which the roll is supported. Since the mesh roll is held in the rolled configuration by the adhering material, the remainder of the roll not yet subject to manual or mechanical force remains intact due to its self-resistance to unrolling. Therefore, the mesh rolls according to the present invention do not require any mechanical device to control unwanted unwinding.

The present invention is further directed to polymeric mesh rolls as described herein in combination with a mining machine for installing the rolls. Mining machines that can be used to install the mesh rolls include, but are not limited to, continuous miner/bolters, roof bolters, jumbos, and other drilling machines. Virtually any type of mining machine may be used in combination with the free-wheeling resistant mesh rolls as described herein because the mining machine does not have to be equipped with any specialized structure for support of the rolls during installation thereof. With the mining machine shown in FIGS. 5-7, the free end of the roll is secured to the roof of the mine and then the unwound portion of the roll is located on the advancing side of the machine's raised roof drill rod.

An additional benefit of the present invention is that, by providing rolls as described herein, the installer's job is made much easier as the rolls, which are often 15 feet wide and 200 feet long, need only be carried to the front of the mining machine once, thus eliminating labor intensive material handling as was needed when installing wire panels.

While the present invention has been described in connection with polymeric mesh rolls, it may be possible to produce free-wheeling resistant rolls for mine support made of wire mesh and held in a rolled configuration with a suitable adhesive material. Accordingly, the present invention is intended to cover wire mesh rolls held with an adhering material and installed using a mining machine in the manner described herein with respect to polymeric mesh rolls.

The foregoing descriptions and photographs should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method of forming and using a polymeric mesh roll for mine roof and wall support that is self-resistant to unrolling, comprising winding a length of polymeric mesh material into a roll of overlapping layers, applying an adhering material to the mesh material, said adhering material penetrating inwardly through openings in the mesh of the overlapping layers toward a center of the roll so that substantially all of the layers that overlap as a result of winding the length of mesh material are secured to one another by the adhering material that penetrates through the openings in the overlapping mesh layers, said adhesive material having sufficient strength to hold the roll in a wound configuration and prevent the roll from free-wheeling or unwinding due to the roll's own physical properties, and using the roll for mine roof and wall support.

2. The method as set forth in claim 1, wherein the adhering material is applied before, as, or after the mesh material is wound.

3. The method as set forth in claim 1, wherein the adhering material is applied after the mesh material has been wound into a roll and the step of applying the adhering material includes inserting an applicator nozzle into the roll and injecting the adhering material under pressure into the wound roll using the applicator nozzle.

4. The method as set forth in claim 3, wherein the step of injecting includes applying greater pressure during a first stage to inject the adhering material into the center of said roll, and applying a lesser pressure as the nozzle is drawn away from the center to outer layers of the roll.

5. The method as set forth in claim 2, wherein the step of applying the adhering material includes spraying or rolling the adhering material onto the mesh material before, or as, the roll is wound.

6. The method as set forth in claim 1, wherein the step of applying the adhering material includes applying said adhering material in a plurality of bands spaced from one another along a width of the roll.

7. The method as set forth in claim 1, wherein the step of applying the adhering material includes selecting an adhering material from a first adhering material having a first adhering strength and a second adhering material having a second adhering strength greater than said first adhering strength, to form a roll with a lesser or a greater degree of resistance to unrolling.

8. The method of forming and using a roll as set forth in claim 1, wherein the step of using the roll includes installing said roll onto a mine roof or wall by applying manual or mechanical force to an outer part of the roll to separate the adhering material bonds in the overlapping layers in the outer part and unwind the outer part of the roll while the overlapping rolls in a remaining inner part of said roll are held intact by remaining adhering material bonds that make the roll self-resistant to unwinding, and fastening said unwound roll outer part to said mine roof or wall.

9. The method as set forth in claim 8, wherein the step of applying force includes pulling on a free end of said outer part of the roll to break the bond between an outermost layer and a layer directly under said outermost layer to form an unwound portion, and continuing to apply force to said unwound portion to incrementally unwind the roll by breaking the bond between each subsequent layer and a layer thereunder moving from the outermost layer inwardly to the center of the roll.

10. The method as set forth in claim 8, wherein said method includes supporting the roll on a mining machine used to install the roll and holding said roll against an outwardly projecting member of said mining machine, said step of applying force including applying mechanical force to the roll by movement of the mining machine to unwind the outer part of the roll while the remaining inner part of said roll remains intact and is held against the outwardly projecting member.

11. The method as set forth in claim 1, further comprising the step of selecting at least one of the adhering material type, adhering material quantity and the grid material to obtain a roll that will not unwind under its own weight when the roll is suspended by its free end when used to support said mine roof or wall.

12. A method of forming and using a polymeric mesh roll for mine roof and wall support that is self-resistant to unrolling, comprising winding a length of polymeric mesh material into a roll of overlapping layers, applying an adhering material to the mesh material, said step of applying the adhering material including spraying or rolling the adhering material onto the mesh material before, or as, the roll is wound, or injecting the adhering material into an interior of the roll after the roll is wound, said adhering material interconnecting substantially all of the overlapping layers within the roll from an outermost layer to a center of the roll, said adhering material having sufficient strength to hold the roll in a wound configuration and prevent the roll from free-wheeling or unwinding due to the roll's own physical properties, and using the roll for mine roof or wall support.

13. The method as set forth in claim 12, wherein the step of applying the adhering material includes applying said adhering material in a plurality of bands spaced from one another along a width of the roll.

14. The method as set forth in claim 12, wherein the step of applying the adhering material includes selecting an adhering material from a first adhering material having a first adhering strength and a second adhering material having a second adhering strength greater than said first adhering strength, to form a roll with a lesser or a greater degree of resistance to unrolling.

15. The method of forming and using a roll as set forth in claim 12, wherein the step of using the roll includes installing said roll onto a mine roof or wall by applying manual or mechanical force to an outer part of the roll to separate the adhering material bonds in the overlapping layers in the outer part and unwind the outer part of the roll while the overlapping rolls in a remaining inner part of said roll are held intact by remaining adhering material bonds that make the roll self-resistant to unwinding, and fastening said unwound roll outer part to said mine roof or wall.

16. The method as set forth in claim 15, wherein the step of applying force includes pulling on a free end of said outer part of the roll to break the bond between the outermost layer and a layer directly under said outermost layer to form an unwound portion, and continuing to apply force to said unwound portion to incrementally unwind the roll by breaking the bond between each subsequent layer and a layer thereunder moving from the outermost layer inwardly to the center of the roll.

17. The method as set forth in claim 15, wherein said method includes supporting the roll on a mining machine used to install the roll and holding said roll against an outwardly projecting member of said mining machine, said step of applying force including applying mechanical force to the roll by movement of the mining machine to unwind the outer part of the roll while the remaining inner part of said roll remains intact and is held against the outwardly projecting member.

18. The method as set forth in claim 12, further comprising the step of selecting at least one of the adhering material type, adhering material quantity and the grid material to obtain a roll that will not unwind under its own weight when the roll is suspended by its free end.

* * * * *